United States Patent [19]
Boyd

[11] Patent Number: 5,268,109
[45] Date of Patent: Dec. 7, 1993

[54] METHOD OF REMOVING HYDROCARBON CONTAMINANTS FROM AIR AND WATER WITH ORGANOPHILIC, QUATERNARY AMMONIUM ION-EXCHANGED SMECTITE CLAY

[76] Inventor: Stephen A. Boyd, 1825 Linden, East Lansing, Mich. 48823

[21] Appl. No.: 32,523

[22] Filed: Mar. 15, 1993

Related U.S. Application Data

[63] Continuation of Ser. No. 575,963, Aug. 31, 1990, abandoned.

[51] Int. Cl.$^5$ .......................... B01D 53/02; C02F 1/28
[52] U.S. Cl. ..................................... 210/691; 210/909; 95/141; 95/142; 95/147
[58] Field of Search .................. 55/74; 210/691, 679, 210/909

[56] References Cited

U.S. PATENT DOCUMENTS

| | | | |
|---|---|---|---|
| 4,386,010 | 5/1983 | Hildebrandt | 252/428 |
| 4,470,912 | 9/1984 | Beall | 210/691 |
| 4,861,491 | 8/1989 | Svensson | 210/691 |

FOREIGN PATENT DOCUMENTS

| | | |
|---|---|---|
| 0181508A3 | 5/1986 | European Pat. Off. |
| 0398410A1 | 11/1990 | European Pat. Off. |
| 1235460 | 5/1960 | France |

*Primary Examiner*—Ivars Cintins
*Attorney, Agent, or Firm*—Marshall, O'Toole, Gerstein, Murray & Borun

[57] ABSTRACT

A method of removing hydrocarbon contaminants from air and a method of removing nonionic organic contaminants, particularly petroleum-derived aromatic contaminants that have a limited capacity to ionize in aqueous solution at substantially neutral pH, from water, by contacting the contaminants in the air or water with an organophilic clay that has been prepared by ion-exchange of an ion-exchangeable clay with a tetra short chain alkyl $C_1$–$C_4$), quaternary ammonium ion for use in removing air-laden contaminants; or a di- or tri- short chain alkyl ($C_1$–$C_4$), with one or two mono- substituted or unsubstituted cycloalkyl moieties, or one or two mono-substituted or unsubstituted aryl or one or two alkaryl moiety quaternary ammonium ion for removing air and water-laden contaminants. The method is particularly adapted for removal of aromatic petroleum-based contaminants from water, such as benzene, toluene, xylene (o, m and p) ethylbenzene and naphthalene, and other water-contained petroleum constituents or derivatives that have a pKa in aqueous solution of at least about 10.

18 Claims, 4 Drawing Sheets

BENZENE ON TMPA AND TMA CLAYS

TOLUENE ON TMPA AND TMA CLAYS

ETHYLBENZENE ON TMPA AND TMA CLAYS

P-XYLENE ON TMPA AND TMA CLAYS

BUTYLBENZENE ON TMPA AND TMA CLAYS

NAPHTHALENE ON TMPA AND TMA CLAYS

METHOD OF REMOVING HYDROCARBON CONTAMINANTS FROM AIR AND WATER WITH ORGANOPHILIC, QUATERNARY AMMONIUM ION-EXCHANGED SMECTITE CLAY

This is a continuation of U.S. application Ser. No. 07/575,963, filed Aug. 31, 1990, now abandoned.

FIELD OF THE INVENTION

The present invention is directed to a chemically modified clay, such as a smectite clay, to render the clay organophilic and to a method of using the chemically modified clay to adsorb aliphatic and aromatic hydrocarbon contaminants from gases, particularly air; and for adsorption of hydrocarbon contaminants from aqueous solutions.

More particularly, the present invention is directed to a cation-exchangeable clay that has been chemically modified to attach a quaternary ammonium ion that includes a) four short chain alkyl moieties ($C_1$–$C_4$) bonded to the quaternary nitrogen atom, e.g. tetramethyl; b) two or three short chain alkyl moieties ($C_1$–$C_4$) and one or two substituted or unsubstituted cycloalkyl; substituted or unsubstituted aryl or alkaryl moiety, e.g. benzyl or phenyl; c) alkylated diazobicyclo ions, such as 1,4-diazobicyclo [2.2.2.] octane (DABCO); or alkyl diammonium cations, such as decyltrimethyldiammonium (DTMA) ions, to provide a modified clay, such as a smectite clay, capable of removing, from water, nonionic organic compounds, (NOCs) such as aliphatic hydrocarbons from air, aliphatic hydrocarbons from water and aromatic hydrocarbons from water that have a pKa in aqueous solution of at least 10. The chemically modified clays function by adsorbing the organic contaminants from gases, e.g. air, or by adsorbing the contaminants from water onto the surface of the clay, as opposed to the known mechanism of prior art organophilic clays in acting as partition phases between the smectite clay interlamellar surfaces for sorption of water-soluble contaminants.

BACKGROUND OF THE INVENTION AND PRIOR ART

Bentonite (smectite) clays are used widely in the construction of liners for hazardous waste landfills, slurry walls, industrial waste treatment lagoons, sewage lagoons, and tank farms. The utility of clays as waterproofing barriers or liners is derived from their ability to disaggregate upon hydration and form a dispersed phase of very small particles. These small clay particles effectively fill the void spaces between larger soil particles resulting in greatly reduced hydraulic conductivity. Thus, the primary function of clay liners, as well as synthetic geo-membraines, is to impede the movement of water.

Smectite clays contain a net negative charge due to isomorphous substitution in the aluminosilicate layers. In nature, this charge is neutralized by cations such as $Na^+$ or $Ca^{2+}$ on the clay interlayers and external surfaces. Hydration of these cations in the presence of water initiates a separation of the clay layers causing a swelling of the clay. In smectites exchanged with monovalent cations having high hydration energies, e.g., $Na^+$ or $Li^+$, the individual clay platelets may become completely separated in the presence of water. However, the maximum distance between individual clay layers of divalent cation-exchanged smectites, e.g., $Ca^{2+}$, $Mg^{2+}$, is about 19 Angstroms. Thus, in the construction of clay liners, Na-smectites are more effective in reducing hydraulic conductivity because they form small highly-dispersed particles in water.

The hydration of naturally occurring metal exchange ions on clays also imparts a hydrophilic nature to the clay surfaces. As a result, natural clays are ineffective in removing nonionic organic contaminants (NOCs) from water. However, by simple-ion-exchange reactions, the naturally occurring inorganic exchange ions of clays can be replaced by a variety of organic cations and this may change the clay surface from hydrophilic to organophilic. These ion-exchange reactions can be used to form stable organo-clay complexes with high affinities for organic contaminants. Such organo-clays can be used in conjunction with conventional clays to increase the containment capabilities of clay barriers by immobilizing organic contaminants present in leachate. The sorptive properties of soils for NOCs also can be greatly enhanced by organic cation exchange of soil clays. Other possible environmental applications of organo-clays are in the stabilization/solidification of industrial wastes and in water purification.

It is possible to modify the surface properties of clays greatly by replacing natural inorganic exchange cations by larger alkylammonium ions. These ions act as 'pillars' which hold the aluminosilicate sheets permanently apart. In the modified form, the clay surface may become organophilic and interact strongly with organic vapours and with organic compounds dissolved in water. These organo-clays are now able to sorb alkanes and aliphatic alcohols to remove organic contaminants from water, and to serve as chromatographic stationary phases.

Until recently, the literature on the sorptive behaviour of organo-clays has been concerned almost exclusively with the organic vapour uptake by dry modified-clay samples. Mortland et al, 1986, *Clays and Clay Minerals* 34, 581, have studied the uptake of phenol and chlorophenols from aqueous solution by smectites whose cations were exchanged by quaternary ammonium ions of the form $[(CH_3)_3\text{-}NR]^+$ where R is an alkyl group. In general, it was found that where R was a large non-polar alkyl group (e.g., $R=C_{16}H_{33}$) the modified clay samples exhibited greatly improved sorption capacities in comparison with unmodified clays or modified clays in which the exchanged organic ions were small in size. It was also found that smectite exchanged with a small tetramethylammonium ion (herein referred to as TMA-smectite) exhibited much higher affinity for benzene from water than for less water-soluble and large sized 1,2,4-trichlorobenzene, McBride, et al., 1977, *in Fate of Pollutants in the Air and Water Environment*, Part 1, Vol. 8, pp. 145–154. The extent of benzene uptake by the TMA-smectite was also much greater than by clays exchanged with tetraethylammonium ion (TEA), or with hexadecyltrimethylammonium ion (HDTMA), in the sequence of TMA-smectite >HDTMA-smectite >TEA-smectite. These studies indicated that the exchanged organic ions affected the sorptive behaviour of clay in some manner that appeared to be related to the size and molecular arrangement of the exchanged ion in the clay.

The sorption characteristics of benzene and trichloroethylene (TCE) on HDTMA-smectite were studied from both aqueous solution and the vapour phase, Boyd et al., *Soil Science Society of America Journal*, 1988, 52, 652. It was found that the dry HDTMA-smectite behaved as a dual sorbent, in much the same fashion as dry soil, in which the bare mineral surfaces function as a solid absorbent and the exchanged HDTMA organic ions function as a partition medium. In aqueous solution, adsorption of non-ionic organic compounds by free mineral surfaces is minimized by the strong competitive adsorption of water, and the uptake of organic solutes by the modified clay is effected mainly by solute partitioning in the organic medium that is formed by conglomeration of large $C_{16}$ alkyl groups associated with HDTMA. The presumed partition effect with the HDTMA-smectite is supported by the linear sorption isotherm, lack of a competitive effect between organic solutes, and the dependence of the sorption capacity on the amount of HDTMA in clay. The uptake of organic vapours by dry HDTMA-smectite was greater than by water-saturated HDTMA-smectite because of concurrent adsorption on mineral surfaces, and consequently, vapour uptake isotherms were not linear. The improved sorption of benzene and TCE from water by HDTMA-smectite over that by pure clays was attributed to partition into the highly non-polar hydrocarbon medium.

Improvement of the sorption capacity of soils with low organic matter contents was similarly achieved by cation exchange reactions with HDTMA ions. This study also demonstrated that HDTMA-derived organic matter added to soil was 10–30 times more effective on a unit weight basis than natural soil organic matter for removing organic contaminants from water. A more detailed analysis of this phenomena appears at *Environ. Science Technol.*, 1989, Vol 23 pg. 1365–1370, hereby incorporated by reference.

The organo clays (organo-smectites, and illites and vermiculites) that include a large alkyl quaternary ammonium hydrocarbon radical, for example, hexadecyltrimethylammonium (HDTMA) appear to form partition phases, fixed on the clay surfaces or interlayers, that are derived from the large alkyl hydrocarbon moieties bonded to the quaternary ammonium nitrogen atom. These partition phases are compositionally and functionally similar to bulk phase hydrocarbon solvents such as hexane or octonol. The sorption of organic solutes from water by these organo-clays show characteristics of solute partitioning including linear isotherms, inverse dependence of the sorption coefficient on the water solubility of the solute, and correspondence between the organic matter normalized sorption coefficients ($K_{om}$) and the octanol-water partition coefficients. The effectiveness of HDTMA-clays can be increased by using clays with high cation-exchange capacities and high surface charge densities.

It has been discovered that the characteristics of NOC sorption from water by smectite clays exchanged with tetramethylammonium ions were completely different from the partition behavior of clays exchanged with large organic cations such as HDTMA. Due to their small size, TMA ions exist as discrete entites on the smectite layers, and therefore do not form partition phases. Rather, TMA-smectite behaves as a surface adsorbent for aliphatic and aromatic hydrocarbons, such as benzene and substituted benzenes and this is manifested in nonlinear sorption isotherms and strong competitive effects in binary solute mixtures. J. F. Lee. M. M. Mortland, C. T. Chiou, S. A. Boyd. "Shape selective adsorption of aromatic molecules from water by tetramethylammoniumsmectite." *J. Chem. Soc., Faraday Trans.* 1, 85, 2953(1989); and J. F. Lee, M. M. Mortland, C. T. Chiou, D. E. Kile, S. A. Boyd. "Adsorption of benzene, toluene, and xylene by two tetramethylammonium-smectites having different charge densities." *Clays and Clay Minerals.* 38, 113 (1990), both hereby incorporated by reference. Tetramethylammonium smectite was shown to be an especially effective adsorbent for removing benzene from water, and for removing benzene vapors from air, exhibiting greater uptake of benzene than HDTMA-smectite. However, TMA-smectite also displayed strong shape selectivity resulting in progressively lower uptake of larger aromatic molecules such as toluene, xylene and ethylbenzene from water, but did not show selectivity for removing organic vapors from air.

Tetramethylammonium-smectite has been studied for removal of organic contaminants from water and for chromatographic use in determining the presence and/or concentration of organic contaminants in air, but has not been disclosed as practically useful for removing hydrocarbon contaminants from gases such as air.

Trimethylphenylammonium-smectite has been studied for removing phenol and chlorophenols from water with very limited success (see M. M. Mortland et al., *Clays and Clay Minerals.* 34, 581 (1986). It is theorized that the ineffectiveness of trimethylphenylammonium-smectite for removal of phenol-based contaminants was due to the relatively high ionization potential of the phenol OH moiety leaving a negatively charged phenolate molecule that cannot be absorbed or adsorbed sufficiently by the negatively charged clay molecules.

Unexpectedly, it has been found that ion-exchangable clays such as the montmorillonites or smectites, particularly the bentonites that have sodium, potassium, lithium magnesium or calcium as their predominant exchangable cations; as well as hectorite; saponite; nontronite; attapulgite; illite; zeolites; vermiculite, and the like, that are ion-exchanged with a) a tetra-short chain alkyl quaternary ammonium compound, e.g. tetramethyl; ion-exchanged with b) a quaternary ammonium compound having two or three short chain alkyl moieties, and one or two mono- substituted or unsubstituted cycloalkyl, or a mono- substituted or unsubstituted aryl or alkaryl moieties, e.g. benzyl or phenyl; c) alkylated diazobicyco ions, such as 1,4-diazobicyclo [2.2.2.] (DABCO); or alkyldiammonium cations, such as decyl-trimethydiammonium (DTMA) ions, effectively adsorb or otherwise remove aliphatic and aromatic hydrocarbon contaminants from gases, e.g. air, and from water, provided that when the contaminants are removed from water, the contaminants have a pKa in aqueous solution (negative log of the acid dissociation constant) of at least about 10.

SUMMARY OF THE INVENTION

In brief, the present invention is directed to a new and improved method of removing hydrocarbon contaminants from air and a method of removing nonionic organic contaminants, particularly petroleum-derived aromatic contaminants that have a limited capacity to ionize in aqueous solution at substantially neutral pH, from water, by contacting the contaminants in the air or water with an organophilic clay that has been prepared by ion-exchange of an ion-exchangeable clay with a tetra short chain alkyl ($C_1$–$C_4$) quaternary ammonium ion for use in removing air-laden contaminants; or a di- or tri- short chain alkyl ($C_1$–$C_4$), with one or two mono-substituted or unsubstituted cycloalkyl, or one or two mono- substituted or unsubstituted aryl or one or two alkaryl moiety quaternary ammonium ion for removing air and water-laden contaminants. The method of the present invention is particularly adapted for removal of aromatic petroleum-based contaminants from water, such as benzene, toluene, xylene (o, m and p) ethylbenzene and naphthalene, and other water-contained petroleum constituents or derivatives that have a pKa in aqueous solution of at least about 10.

Accordingly, one aspect of the present invention is to provide a new and improved method of removing an nonionic organic contaminant from water by contacting the contaminant with an ion-exchanged smectite clay, wherein the nonionic organic contaminant is aliphatic or the contaminant is aromatic and has a pKa in aqueous solution of at least 10, wherein the ion-exchanged smectite clay includes a quaternary ammonium ion of the formula:

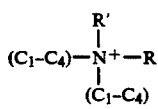

wherein R is a substituted or unsubstituted cycloalkyl moiety or a substituted or unsubstituted aryl or alkaryl moiety, and wherein R' is ($C_1$-$C_4$) or a substituted or unsubstituted cycloalkyl moiety or a substituted or unsubstituted aryl or alkaryl moiety.

Another aspect of the present invention is to provide a new and improved method of removing non-ionic organic contaminants from air by contacting the contaminants with an ion-exchanged smectite clay that includes a quaternary ammonium ion of the formula:

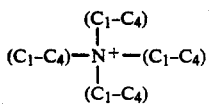

In accordance with another embodiment of the present invention, the quaternary ammonium ion exchanged with the clay cations can be a di-quaternary ammonium ion, particularly di-quaternary ammonium ions selected from the group consisting of alkylated diazobicyclo di-quaternary ammonium ions and $C_1$-$C_{20}$ trialkyl ($C_1$-$C_4$) di-quaternary ammonium ions.

Suitable alkylated ($C_1$-$C_4$) diazobicyclo ions useful for adsorbing organic contaminants from gases, such as air, and from water include the diazobicyclo compounds that have $C_8$-$C_{14}$ membered rings wherein two of the carbon atoms of the ring structure have been substituted with nitrogen atoms. A particularly suitable alkylated ($C_1$-$C_4$) diazobicyclo ion is 1,4-diazobicyclo [2.2.2.] octane, wherein the alkyl moiety is $CH_3$:

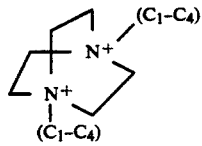

Other suitable alkylated diazobicyclo ions include
1,4—Diazobicyclo [3.2.2] nonane; 1,4—Diazobicyclo [3.3.2] decane; 1,5—Diazobicyclo [3.3.3] undecane; 1,4—Diazobicyclo [4.2.2] decane; 1,4—Diazobicyclo [4.3.2] undecane; 1,5—Diazobicyclo [4.3.3] dodecane; 1,5—Diazobicyclo [4.4.3] tridecane; 1,6—Diazobicyclo [4.4.4] tetradecane; and 1,4—Diazobicyclo [4.4.2]dodecane.

Another class of diammonium compounds that are useful for adsorbing nonionic organic hydrocarbons from gases, such as air, and from water include the alkyldiammonium ions having a general formula:

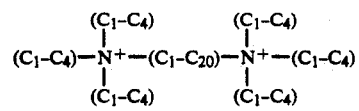

such as the decyltrimethyldiammonium (DTMDA) ion:

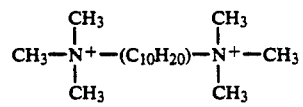

These and other aspects and advantages of the present invention will become more apparent from the following detailed description of the preferred embodiments, taken in conjunction with the drawings.

DETAILED DESCRIPTION OF THE PREFERRED EMBODIMENTS

Figure 1:
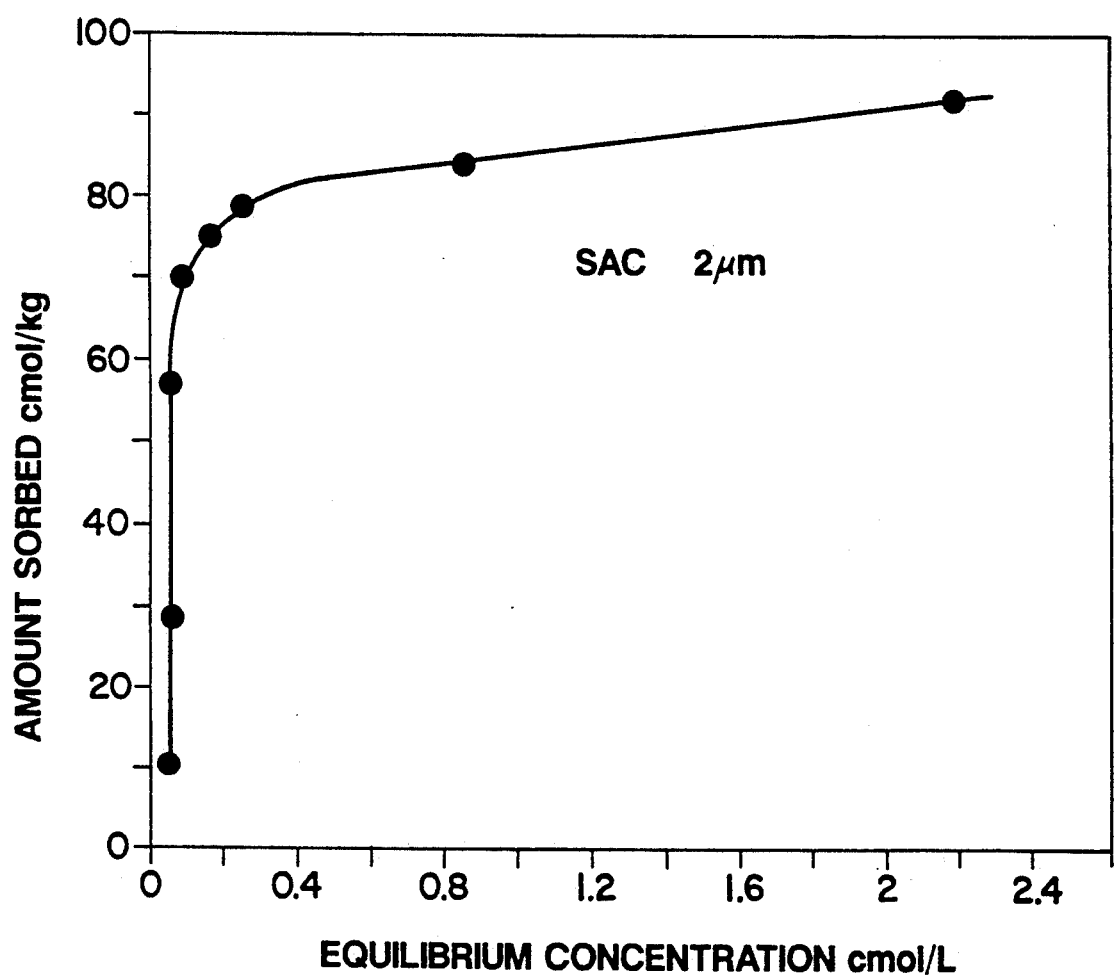
FIG. 1 is a graph showing the adsorption of trimethylphenylammonium on Mg-smectite (SAC)
Figure 2A:
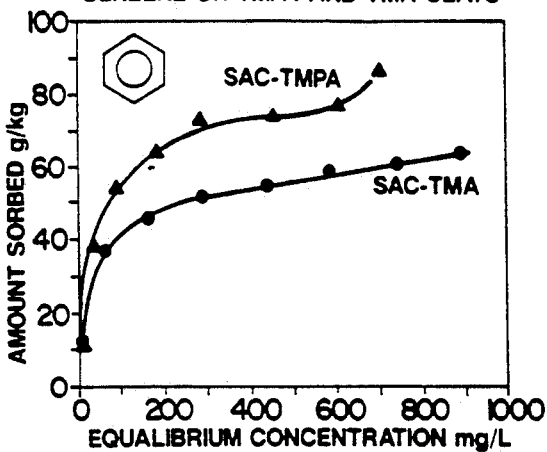
FIG. 2 is a graph showing the adsorption of aromatic hydrocarbons on trimethylphenylammonium (TMPA)- and tetramethylammonium (TMA)-smectite (SAC)
Figure 2B:
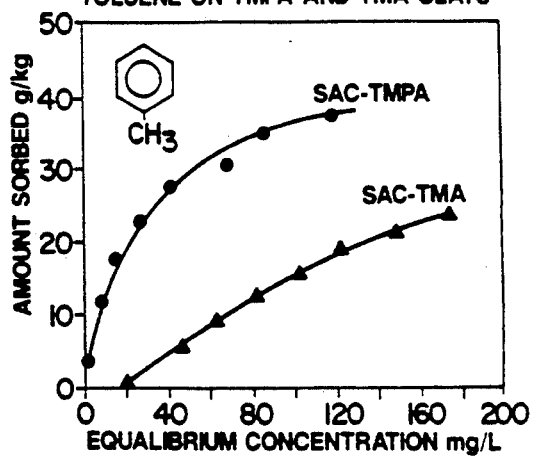
Figure 2C:
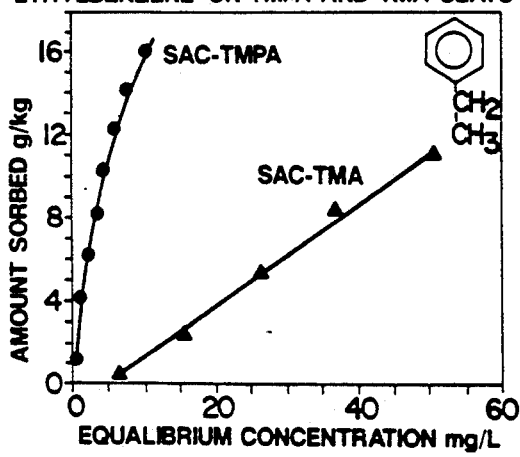
Figure 2D:
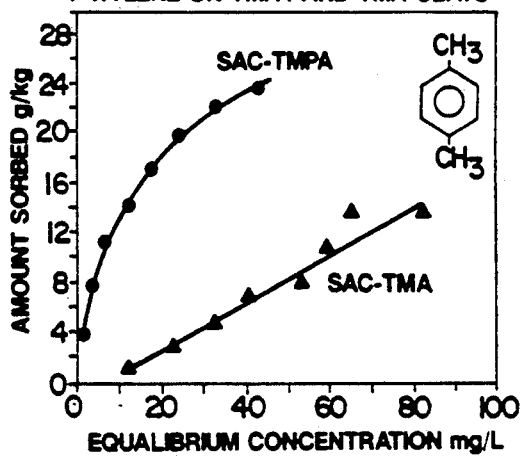
Figure 2E:
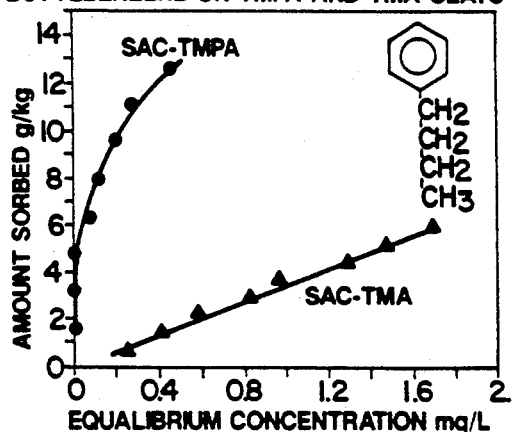
Figure 2F:
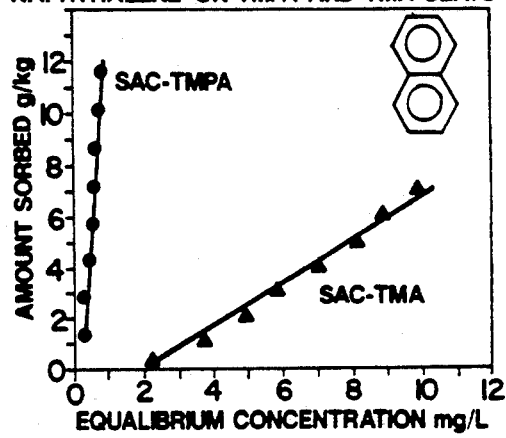

The clays that can be ion-exchanged with the quaternary ammonium ions disclosed herein can be any clay capable of sufficient low-exchange with the quaternary ammonium ions described to render the clays organophilic.

Preferably, the water-swellable colloidal clay that can be ion-exchanged with the quaternary ammonium compounds described herein include any water-swellable clay which will hydrate in the presence of water, i.e., will swell in the presence of water. In accordance with one important embodiment of the present invention, the clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations such as lithium, potassium, calcium, ammonium, magnesium and iron.

There are cases wherein a montmorillonite predominant in calcium ions can be converted to a high swelling sodium variety through a well known process called "peptizing". The clay utilized in this invention may be one or more peptized bentonites. The clay may also be any member of the dioctahedral or trioctahedral smectite group or mixtures thereof. Examples are Beidellite, Nontronite, Hectorite and Saponite. Attapulgite, illite and vermiculite also are useful in accordance with the present invention. To achieve the full advantage of the present invention, the colloidal clay, e.g., bentonite, generally is finely divided as known for use in water barrier panels and the like, i.e. 150 to 350 mesh.

The cation-exchange capacities of these clays are well known and sufficient quaternary ammonium compound is dissolved in aqueous solution in contact with the ground or otherwise finely divided colloidal clay in aqueous suspension to achieve sufficient quaternary ammonium ion cation exchange to render the clay organophilic. Sufficient time is allowed for complete cation exchange, e.g. 30 minutes to 24 hours, with two to four hours being a sufficient time for complete cation exchange for most clays. A stoichiometric excess of quaternary ammonium compound of two to five times the cation exchange capacity of the clay is preferred to assure quaternary ammonium ion-exchange as complete as possible with the colloidal clay. After cation exchange, the excess quaternary ammonium cations, quaternary ammonium anions, any precipitated salts, and cations removed from the clay in the cation exchange are removed by filtration, dialysis or the like, and the clay is washed in water, e.g. distilled water. For storage purposes, the resulting organophilic ion-exchanged clay can be frozen and/or freeze dried to maintain the organic ion-exchange capacity for long periods of time.

For purposes of removing organic contaminants from gases, such as air, it has been found that excellent results are achieved with a quaternary ammonium compound of the formula:

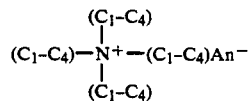

for example tetramethylammonium chloride or bromide, tetraethylammonium chloride or bromide, tetrapropylammonium chloride or bromide, tetrabutylammonium chloride or bromide, trimethylmonoethylammonium chloride or bromide, or any other combination of $C_1$-$C_4$ radicals capable of synthesis. The particular anion associated with the quaternary ammonium cation is of no significant consequence in the ion-exchange reaction with the clay.

For removal of gas-laden or water-laden organic aliphatic contaminants, and aromatic contaminants having a pKa of at least 10, the quaternary ammonium compound that is ion exchanged with the colloidal clay should have a formula:

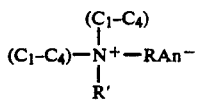

Wherein R is a substituted or unsubstituted cycloalkyl moiety; a substituted or unsubstituted aryl moiety; or a substituted or unsubstituted alkaryl moiety, and wherein R' is $C_1$-$C_4$ or a substituted or unsubstituted cycloalkyl moiety or a substituted or unsubstituted aryl or alkaryl moiety. With respect to each of these moieties R, the cycloalkyl moieties can have from three to about seven carbon atoms. The aryl moiety of the substituted and unsubstituted aryl and/or alkaryl moieties can be, for example, phenyl, napthenyl, trienyl, pyridyl, pyrolyl, pyridyl, furyl, pyrazolyl, pyridazinyl, pyrimidyl, quinolyl, isoquinolyl, acridinyl and similar five-numbered and six-numbered carbocyclic and heterocyclic aromatic compounds; and wherein the alkaryl moiety is benzyl, 2-phenylethyl and similar aryl-substituted alkyl groups including from one to about four carbon atoms; and wherein the aryl or alkaryl moiety is substituted within a functionality such as, for example, hydroxy (—OH); alkoxy (—OR); alkyl (—R); halo (—X), amino (—$NH_2$, —NHR, —$NR_2$); nitro (—$NO_2$); cyano (—CN); alkyl sulfonyl (—$SO_2R$); mercapto (—CH); alkylthio (—SR); carbonyl functionalities having the formula —CO—Y, wherein Y is hydrogen, hydroxy, alkoxy, halo amino, or alkyl; and combinations thereof, wherein R is an alkyl group including from one carbon atom to about 20 carbon atoms and X is chloro, bromo or fluoro.

In accordance with another embodiment of the present invention, the quaternary ammonium ion exchanged with the colloidal clay cations can be a di-quaternary ammonium, particularly di-quaternary ammonium compounds selected from the group consisting of alkylated diazobicyclo di-quaternary ammonium ions and $C_1$-$C_{20}$ trialkyl diammonium quaternary ammonium ions.

Suitable alkylated ($C_1$-$C_4$) methylated diazobicydo ions useful for adsorbing organic contaminants from gases, such as air, and from water include the diazobicyclo compounds that have $C_8$-C membered rings wherein two of the carbon atoms of the ring structure have been substituted with nitrogen atoms. A particularly suitable alkylated ($C_1$-$C_4$) diazobicyclo ion is 1,4-diazobicyclo [2.2.2.] octane, wherein the alkyl moiety is $CH_3$:

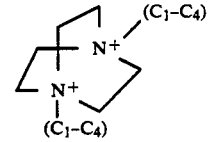

Other suitable alkylated diazobicyclo ions include: 1,4—Diazobicyclo[3.2.2] nonane; include: 1,4—Diazobicyclo [3.2.2] nonane; 1,4 Diazobicyclo [3.3.2] decane; 1,5—Diazobicyclo [3.3.3] undecane; 1,4—Diazobicyclo [4.3.2] decane; [1,4—Diazobicyclo [4.3.2] undecane; 1,5—Diazobicyclo 4.3.3] dedecane; 1,5—Diazobicyclo [4.4.3] tridecane; 1,6—Diazobicyclo [4.4.4] tetradecane; and 1,4—Diazobicyclo [4.4.2] dedecane.

Another class of diammonium compounds that is useful for adsorbing nonionic organic hydrocarbons from gases, such as air, and from water include the alkyldiammonium ions having a general formula:

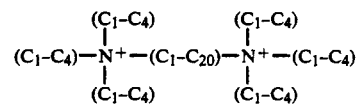

such as the decyltrimethyldiammonium (DTMDA) ion:

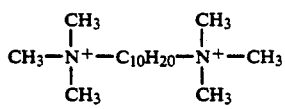

These ion-exchanged clays are particularly effective for removing nonionic organic contaminants, halogenated hydrocarbons, and derivatives of petroleum-derived organic contaminants from gases, e.g. air, and water, such as benzene, toluene, ethylbenzene, o, m, and p-xylene, butylbenzene, napthalene, carbontetrachloride, chloroform, mono-chloroethane, di-chloroethane, tri-chloroethane, tetrachloroethane, mono-, di-, tri- and tetrachloroethenes, polychlorinated biphenyls, dioxin, and other common oil-spill problem contaminants, provided that the contaminants have a pKa of at least about 10 in water.

A Wyoming bentonite (SAC) and a South Carolina vermiculite (VSC) sample were obtained from the American Colloid and Zonolite companies, respectively. The bentonite is primarily composed of low-charge smectite The vermiculite contains biotite and hydrobiotite. Ferruginous smectite (nontronite) (SWa) was obtained from the Source Clay Repository of The Clay Minerals Society. The <2 μm clay fractions were obtained by wet sedimentation and were subsequently Na-saturated, frozen, and freeze-dried. The mineralogy and properties of the clays used in this study are summarized in TABLES 1 and 2.

TABLE 1

Mineralogy and Source of Samples

| Sample Designation | Mineralogy | Origin | Source |
|---|---|---|---|
| SAC | low-charge smectite, <2 μm | Wyoming bentonite | American Colloid Co. |
| SWa | high charge <2 μm smectite (nontronite) | Grant Co., Washington | Clay Minerals Society Repository |
| VSC | vermiculite, hydrobiotite | South Carolina | Zonolite Co. |

TABLE 2

Properties of Clay Minerals and Derived Trimethylphenylammonium (TMPA)- and Tetramethylammonium (TMA)-Clays

| Sample | Cation Exchange Capacity (cmol$^-$/kg) | Charge (mol$^-$/ unit cell) | Organic Carbon (%) | $d_{001}$ (Å) |
|---|---|---|---|---|
| SAC | 90 | 0.64 | — | — |
| SAC-TMPA | | | 9.15 | 14.5 |
| SAC-TMA | | | 3.66 | 14.0 |
| SWa | 107 | 0.96 | — | — |
| SWa-TMPA | | | 9.66 | 15.2 |
| SWa-TMA | | | 4.01 | 14.2 |
| VSC | 110 | 1.32 | — | — |
| VSC-TMPA | | | 5.02 | 15.1 |

Tetramethylammonium (TMA) and Trimethylphenylammonium (TMPA) organo-clays were prepared by adding quantities of the respective chloride salts equal to five times the cation exchange capacity of the clay. The TMA and TMPA chlorides were dissolved in distilled water and added to clay suspensions which were agitated with a magnetic stirrer. After mixing for 4 hours, the TMA and TMPA clay suspensions were sealed in dialysis tubing and dialyzed in distilled water until free of salts. The resulting TMA and TMPA clay suspensions were later quick-frozen and freeze-dried. Organic carbon analyses were then performed on the organo-clays.

X-Ray Diffraction Analysis

Samples (30 mg) of the TMA- and TMPA-clays were washed with 5 ml of 95% ethanol, ultrasonically dispersed in 2 ml of 95% ethanol, and dried as oriented aggregates on glass slides. Basal x-ray diffraction spacings (TABLE 2) then were recorded using Cuk radiation and a Philips APD 3720 automated x-ray diffractometer consisting of an APD 3521 gonimeter fitted with a theta-compensating slit, a 0.2-mm receiving slit, and a diffracted-beam graphite monochromator.

Adsorption Isotherms

The ultraviolet absorbance of TMPA solutions was used to measure TMPA adsorption to clays. A batch adsorption isotherm of TMPA on Mg-saturated smectitie (SAC) was obtained using 100 mg samples of clay in 25 ml Corex centrifuge tubes. Aqueous solutions of TMPA chloride equal to about 0.25, 0.50, 0.75, 1.0, 1.25, 1.5, 3.0, and 6.0 times the cation exchange capacity of the clay were added and the total volume was brought to 20 ml with distilled water. After shaking for 8–12 hours, the tubes were centrifuged and the equililbrium solutions were collected. The absorbances of the equilibrium solutions were measured at 230 nm and converted into centimoles (cmoles) of TMPA/liter from a standard plot of TMPA concentration versus absorbance. Differences between TMPA concentrations in the initial and equilibrium solutions were used to calculate the quantity adsorbed in cmoles TMPA/kg of clay.

Batch sorption isotherms of benzene, toluene, ethylbenzene, p-xylene, butylbenzene and naphthalene on the TMA- and TMPA-clays were made by weighing 0.05 to 0.20 g samples into 25 ml Corex centrifuge tubes that contained 25 ml of distilled water. Hamilton microliter syringes were used to deliver a range of concentrations of each compound up to 70% of the water solubility. Benzene was added directly as the neat liquid, whereas toluene, ethylbenzene, p-xylene, butylbenzene and naphthalene were delivered as methanol solutions. To reduce vaporization losses, aluminum foil liners were placed on the tubes and the teflon-lined caps were promptly sealed. Blank samples containing 25 ml of distilled water and the added organic compounds also were prepared to estimate vaporization losses and adsorption to the glass. Samples were placed on a reciprocating shaker and agitated for 12–18 hours under ambient conditions. After centrifugation, a 1 to 5 ml aliquot of the supernatant was extracted with 10 ml of $CS_2$ in a glass vial. A portion of the $CS_2$ extract containing the extracted compound then was analyzed using gas chromatography.

Isotherms were constructed by plotting the amounts sorbed versus the concentrations remaining in solution ($C_e$). The amount sorbed was calculated from differences between the quantity of organic compound added and that remaining in the equilibrium solutions. Typical blank recoveries ranged from 85–95%; the data were not adjusted for these recoveries.

Concentrations of the organic compounds in the $CS_2$ extracts were measured with a Hewlett Packard 5890A gas chromatograph using a flame ionization detector. A packed column with 5% SP-1200/1.75% Bentonite 34 coated on a 100–120 mesh Supelcoport support with $N_2$ as the carrier gas was used for all separations. Peak areas were determined with a Hewlett Packard 3392A integrator and a Hewlett Packard 7673A automatic sample changer was used to automate runs.

An adsorption isotherm representing the ion-exchange of TMPA to a Mg-saturated smectite (SAC) is shown in FIG. 1. The steep initial rise of this isotherm shows that $Mg^{2+}$ is nearly stoichiometrically displaced by TMPA until about 90 percent of the cation exchange sites are occupied by TMPA. Addition of TMPA in excess of the cation exchange capacity assures complete saturation of the cation exchange sites. The ion-exchange reaction between TMPA and Na-smectite should be even more favorable than with Mg-smectite due to the greater exchangeability of monovalent cations.

Organic carbon contents and basal spacings of the TMPA- and TMA- smectites are presented in Table 2. The organic carbon contents of the organo-smectites indicate that the cation exchange sites are completely occupied by the organic cations. However, the organic carbon content of the TMPA-exchanged vermiculite indicates that TMPA occupies only about 60 percent of the exchange sites. This likely results from the limited swelling of Na-vermiculite in water (14.5 Angstroms), and the larger particle size of vermiculite, which imposes a diffusional limit on the exchange reaction.

The x-ray diffraction basal spacings ($d_{001}$) of the TMPA- and TMA-smectites were between 14 and 15.2 Angstroms. The basal spacings of the TMPA-smectites were slightly larger (0.5 to 1.0 Angstroms) than those of the TMA-smectite, consistent with the larger size of TMPA as compared to TMA ions. These basal spacings, which include the 2:1 aluminosilicate sheet (9.4 Angstroms), indicate an interlayer separation ($\Delta$) of about 4.6 to 4.8 Angstroms for TMA-smectite, and 5.1 to 5.8 Angstroms for TMPA-smectite. This agrees well with the height of the TMA ion which is 4.9 Angstroms, and suggests some keying of the hydrogen atoms into the aluminosilicate sheets. These data indicate that the triangular bases of TMA and TMPA ions are parallel to the clay sheets, and presumably these bases adhere alternatively to the upper and lower clay layers.

In contrast to TMA-and TMPA-smectites, HDTMA-smectites give much larger basal spacings of between 18 and 23 Angstroms, depending on the layer charge of the mineral. These spacings for HDTMA-smectites correspond to the formation of bilayers and paraffin complexes in which HDTMA ions are in direct contact with each other, leading to the formation of partition phases derived from the $C_{16}$ hydrocarbon groups.

Isotherms representing the adsorption of benzene, toluene, ethylbenzene, p-xylene, butylbenzene and naphthalene by TMA- and TMPA-smectite (SAC) are shown in FIG. 2. Benzene sorption produces a curvlinear Langmuir-type isotherm on TMA-smectite. A similar isotherm is observed for benzene sorption on TMPA-smectite, although uptake at relatively high equilibrium solution benzene concentrations ($C_e > 100$ ppm) is somewhat reduced compared to TMA-smectite. Surprisingly, these isotherms show that the ratio of sorbed benzene to benzene remaining in solution is initially very large, i.e. at $C_e < 100$ to 200 ppm, but decreases as the amount of sorbed benzene increases. This type of sorptive behavior is characteristic of surface adsorption, and contrasts to the partition behavior of HDTMA-smectite where the ratio of sorbed to solution phase aromatic hydrocarbon remains relatively constant over a wide range of $C_e$ values.

The sorption isotherms of FIG. 2 also show that TMPA-smectite is a far more effective adsorbent for alkylbenzenes and naphthalene than TMA-smectite. The sorptive capability of TMA-smectite decreases markedly as the size of the alkyl substituent increases in going from benzene to toluene to ethylbenzene to xylene to butylbenzene. In the case of TMPA-smectite, however, the high uptake from water is also observed for toluene, ethylbenzene, xylene, butylbenzene and naphthalene. Thus, while TMA-smectite exhibits strong shape selectivity and is a poor sorbent for alkylbenzenes and naphthalene, TMPA-smectite shows no steric exclusion and effectively removes these compounds from water.

The high affinity of TMPA-smectite for the highly water soluble aromatic constituents of petroleum is important because these compounds represent some of the most common organic ground water contaminants. Thus, in accordance with the present invention, TMPA-smectite and other tri-short chain alkyl monoacyclic-smectites have great utility as liner materials for petroleum containments, as for example in tank farms and underground storage tanks. The use of tri-short chain ($C_1$-$C_4$), mono- substituted or unsubstituted cycloalkyl, aryl, or alkaryl ammonium-smectites:

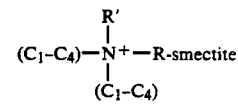

, wherein R is a substituted or unsubstituted cycloalkyl moiety or a substituted or unsubstituted cycloalkyl moiety or a substituted or unsubstituted aryl or alkaryl moiety; and where R' is $C_1$-$C_4$ or a substituted or unsubstituted cycloalkyl moiety, or a substituted or unsubstituted aryl or alkaryl moiety, in conjunction with Na-smectite in such applications results in a liner composite with the desirable properties of low hydraulic conductivity (derived from Na-smectite), and high sorptive removal of water-laden hydrocarbon contaminants aromatic hydrocarbon contaminants (derived from TMPA-smectite).

Figure 3A:
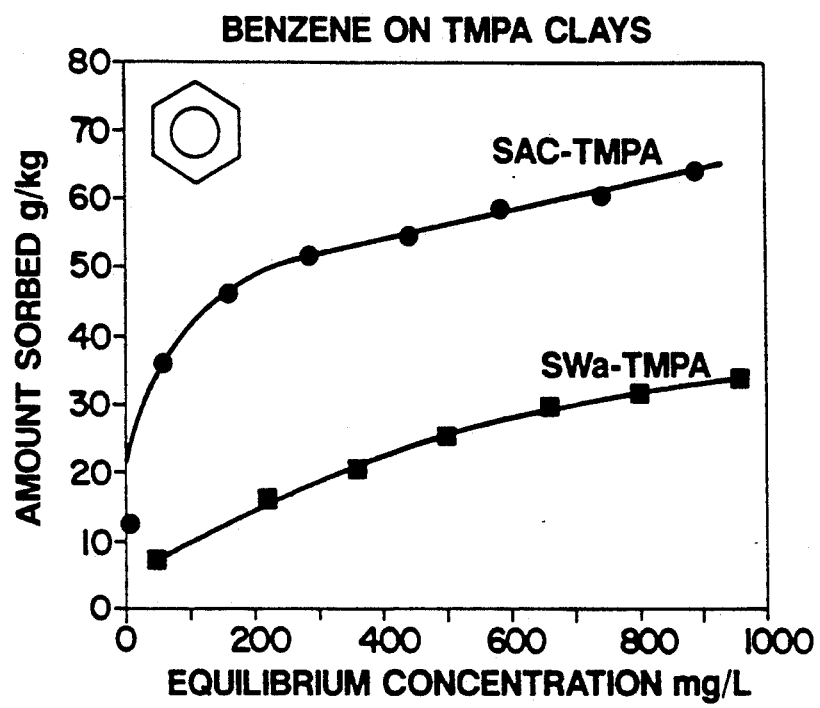
FIG. 3 is a graph showing the adsorption of benzene and toluene on low charge (SAC)-and high-charge (SWa)-trimethylphenylammonium smectites.
Figure 3B:
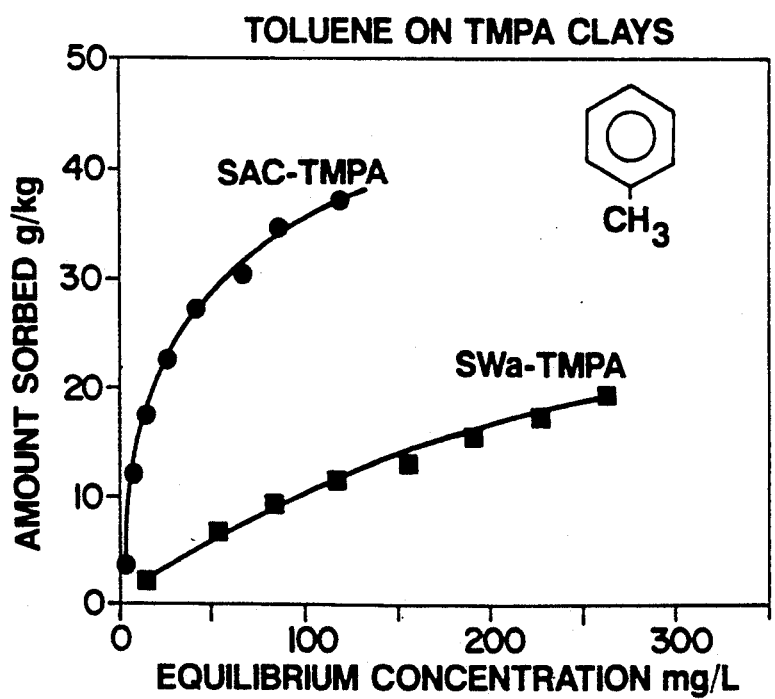
Figure 4:
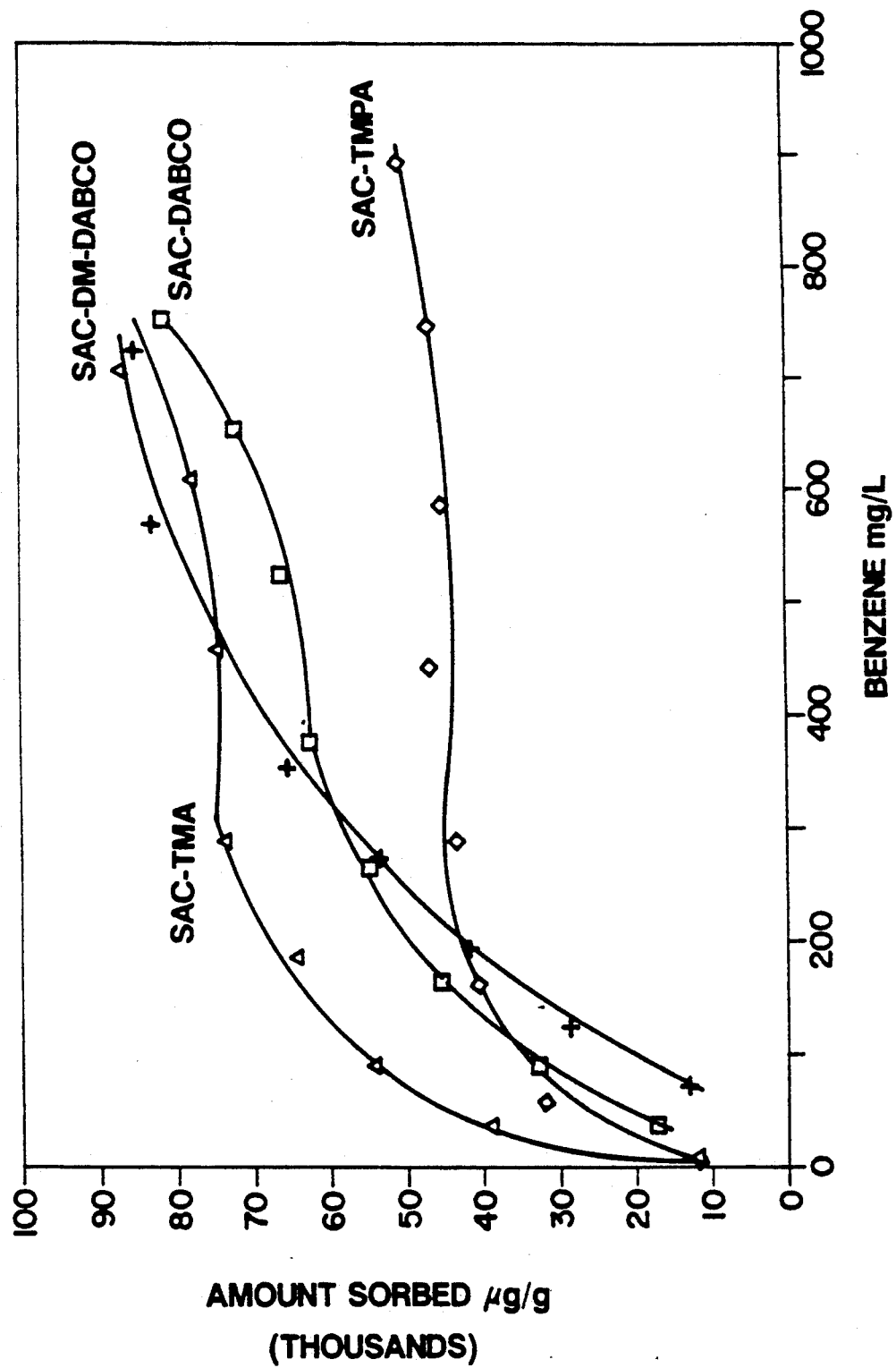
FIG. 4 is a graph showing absorption of benzene by smectite clay (SAC) exchanged with tetramethylammonium (TMA), dimethyl- 1,4-diazobicyclo [2.2.2] octane (DM-CABCO), 1,4-diazobicyclo [2.2.2] octane (DABCO), and trimethyl-phenylammonium (TMPA).

The effects of layer charge of the clay mineral used to prepare the TMPA-smectites was evaluated using smectites with a layer charge of 0.64 (denoted SAC) and 0.96 (denoted SWa) mol$^-$/unit cell (TABLE 2). The effect of layer charge on the sorptive capabilities of the TMPA-smectites was dramatic as illustrated in FIG. 3. The low-charge (SAC) TMPA-smectite was a much more effective adsorbent for removing benzene and toluene from water than was the high-charge (SWa) TMPA-smectite. Apparently in these clays, the closer packing of exchanged TMA or TMPA ions in the clay interlayers results in restricted access of the aromatic molecules to the interlamellar regions.

Clearly, the effect of layer charge is different for TMPA-smectites than that observed previously for HDTMA-smectites. The larger quantity of exchanged HDTMA in higher charge smectites enhances sorption of benzene and toluene relative to the lower charge analogs. Yet, a greater quantity of exchanged TMPA in SWa-TMPA results in less benzene uptake than by SAC-TMPA. These observations are consistent with the different sorptive mechanisms of the organo-clays, i.e., the partition behavior of HDTMA-smectite versus the adsorptive behavior of TMPA-smectite.

In accordance with the present invention, replacing the exchangeable inorganic cations of a low-charge smectite (e.g., SAC) with TMPA cations results in an organo-clay that can effectively remove hydrocarbon contaminants, e.g. benzene, alkyl-substituted benzenes and naphthalene from water. The Langmuir-type adsorption isotherms exhibited by TMPA-smectite make this organo-clay an especially effective adsorbent at low ($<$0.1 to 0.2) relative equilibrium solution concentrations (equilibrium concentration/water solubility of the solute). In this concentration range, TMPA-smectite is the most effective organo-clay yet developed for removing aromatic hydrocarbons from water.

While there have been illustrated and described various embodiments of the present invention, it will be apparent that various changes and modifications will occur to those skilled in the art. It is intended in the appended claims to cover all such changes and modifications as fall within the true spirit and scope of the present invention. Additionally, it should be understood that the foregoing description is to be construed as illustrative and not in any limiting sense.

What is claimed and desired to be secured by Letters Patent of the United States is:

1. A method of adsorbing an aromatic organic compound having a pKa of at least 10, from air or water comprising contacting the organic compound with a quaternary ammonium ion-exchanged colloidal clay including a quaternary ammonium ion-exchanged cation of the formula:

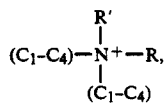

wherein R is a moiety selected from the group consisting of substituted or unsubstituted cycloalkyl having 3 to about 7 carbon atoms; substituted or unsubstituted aryl and wherein R' is $C_1$-$C_4$ or a substituted or unsubstituted cycloalkyl moiety having 3 to about 7 carbon atoms; or a substituted or unsubstituted aryl moiety or a substituted or unsubstituted alkaryl moiety, wherein the alkyl of the alkaryl moiety has from 1 to about 4 carbon atoms.

2. The method of claim 1 wherein R is a cycloalkyl moiety having 3 to about 7 carbon atoms.

3. The method of claim 1 wherein R is benzyl or phenyl.

4. The method of claim 1 wherein the organic compound is selected from the group consisting of a petroleum component, a petroleum derivative, and combinations thereof.

5. The method of claim 1 wherein the organic compound is selected from the group consisting of benzene, toluene o-xylene, m-xylene, p-xylene, ethylbenzene, butylbenzene, naphthalene, polychlorinated biphenyls, dioxin, and mixtures thereof.

6. The method of claim 5 wherein R is benzyl or phenyl.

7. The method of claim 6 wherein the clay is a smectite clay.

8. The method of claim 7 wherein R is a cycloalkyl moiety having three to about seven carbon atoms.

9. The method of claim 5 wherein R is an aryl moiety having 3 to about 7 carbon atoms.

10. The method of claim 1 wherein R is a substituted or unsubstituted aryl moiety selected from the group consisting of phenyl, napthenyl, trienyl, pyridyl, pyrrolyl, furyl, pyrazolyl, pyradazinyl, pyrimidyl, quinolyl, isoquinolyl, benzyl, and acridinyl.

11. The method of claim 1 wherein one or both of R and R' are a substituted alkaryl moiety, wherein the alkyl or the alkaryl moiety has from 1 to about 4 carbon atoms wherein the alkaryl moiety is substituted with a functionality selected from the group consisting of a hydroxy; alkoxy (—OR); alkyl (—R); halo (—X); amino (—$NH_2$), —NHR, —$NR_2$, —$NR_3$); nitro (—$NO_2$); cyano (—CN); alkyl sulfonyl (—$SO_2R$); mercapto (—SH); alkylthio (—SR); carbonyl (—COY); and mixtures thereof; wherein R is an alkyl group having 1 to about 4 carbon atoms; X is a halogen atom selected from chloro, bromo and fluoro; and Y is selected from hydrogen, hydroxy, alkoxy, haloamino and alkyl having 1 to about 4 carbon atoms.

12. The method of claim 1 wherein the cation has the formula:

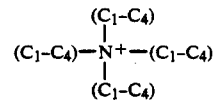

13. The method of claim 1 wherein the cation has the formula:

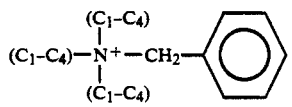

14. The method of claim 1 wherein the cation has the formula:

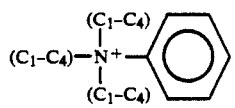

15. The method of claim 1 wherein R is an aryl moiety having 3 to about 7 carbon atoms.

16. A method of adsorbing benzene from water comprising contacting the benzene-containing water with a trimethylphenylammonium ion-exchanged smectite clay.

17. A method of adsorbing an aromatic organic compound from water, wherein the organic compound is selected from the group consisting of benzene, toluene, ethylbenzene, xylene, butylbenzene, naphthalene, and mixtures thereof, comprising contacting the organic compound-containing water with a trimethylphenylammonium ion-exchanged smectite clay.

18. A method of adsorbing an aromatic organic compound from water, wherein the organic compound is selected from the group consisting of benzene, toluene, ethylbenzene, xylene, butylbenzene, naphthalene, and mixtures thereof, comprising contacting the organic compound-containing water with an ion-exchanged clay selected from the group consisting of a trimethylphenylammonium ion-exchanged smectite clay, a tetramethylammonium ion-exchanged smectite clay, and mixtures thereof.

* * * * *

UNITED STATES PATENT AND TRADEMARK OFFICE
CERTIFICATE OF CORRECTION

PATENT NO. : 5,268,109
DATED : DECEMBER 7, 1993
INVENTOR(S) : STEPEHN A. BOYD

It is certified that error appears in the above-indentified patent and that said Letters Patent is hereby corrected as shown below:

Column 1, line 59, after "neutralized by" insert -- inorganic --;

Column 8, line 48, delete "1,4-Diazobicyclo[3.2.2] nonane; include:";

Column 8, line 51, after "decane;" and before "1,4" delete "[";

Column 8, line 52, after "1,5-Diazobicyclo" and before "4.3.3" insert -- [ --; and Column 14, line 4, after "pyrazolyl," delete "pyradazinyl," and substitute therefor -- pyridazinyl --.

Signed and Sealed this

Twentieth Day of December, 1994

Attest:

BRUCE LEHMAN

*Attesting Officer*  *Commissioner of Patents and Trademarks*